(12) United States Patent  (10) Patent No.: US 9,357,136 B2
Noorkami et al.  (45) Date of Patent: May 31, 2016

(54) USING INERTIAL SENSORS TO PROVIDE SMOOTHED EXPOSURE AND WHITE BALANCE ADJUSTMENTS FOR VIDEO AND PHOTOGRAPHIC APPLICATIONS

(71) Applicant: Nokia Corporation, Espoo (FI)

(72) Inventors: Maneli Noorkami, San Francisco, CA (US); Daniel A. Vaquero, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 93 days.

(21) Appl. No.: 14/172,258

(22) Filed: Feb. 4, 2014

(65) Prior Publication Data

US 2015/0222799 A1  Aug. 6, 2015

(51) Int. Cl.
*H04N 9/73* (2006.01)
*H04N 5/228* (2006.01)
*H04N 5/235* (2006.01)

(52) U.S. Cl.
CPC ............. *H04N 5/2352* (2013.01); *H04N 5/235* (2013.01); *H04N 9/735* (2013.01)

(58) Field of Classification Search
None
See application file for complete search history.

(56) References Cited

U.S. PATENT DOCUMENTS

| 7,330,206 B2 | 2/2008 | Nishimura |
| 8,077,256 B1 | 12/2011 | Price et al. |
| 8,300,970 B2 | 10/2012 | Lee |
| 2004/0160525 A1 | 8/2004 | Kingetsu et al. |
| 2009/0015921 A1 | 1/2009 | Yoon et al. |
| 2010/0149353 A1 | 6/2010 | Jang et al. |
| 2010/0265342 A1* | 10/2010 | Liang et al. ............... 348/208.4 |
| 2012/0007996 A1 | 1/2012 | Bilcu |
| 2013/0057713 A1 | 3/2013 | Khawand ................... 348/208.1 |
| 2013/0242120 A1* | 9/2013 | Venkatraman et al. .... 348/208.4 |
| 2013/0308002 A1 | 11/2013 | Jiang et al. |

FOREIGN PATENT DOCUMENTS

| JP | 2006033123 A | 2/2006 |
| JP | 2007208406 A | 8/2007 |
| WO | 2010100320 A1 | 9/2010 |

OTHER PUBLICATIONS

Battiato, S., et al., "Exposure Correction for Imaging Devices: An Overview. In Single-Sensor Imaging: Methods and Applications for Digital Cameras, CRC Press, 2008", http://www.dmi.unict.it/~battiato/download/Exposure2008; 33 pgs.

* cited by examiner

*Primary Examiner* — Lin Ye
*Assistant Examiner* — Euel Cowan
(74) *Attorney, Agent, or Firm* — Harrington & Smith (57) ABSTRACT

A first image frame is gathered. The first image frame, a first white balance value, and a first exposure value are stored. Information is sensed from an inertial sensor. A second image frame and intermediate image frames are gathered. A distance traversed by a camera is determined. In response to one or more of: the distance exceeding a predetermined threshold, or a new white balance value significantly differing from a previous white balance value, or a new exposure value significantly differing from a previous exposure value, a second white balance value and a second exposure value are determined for the second image frame. A smoothed white balance value and a smoothed exposure value are determined for the intermediate image frames.

24 Claims, 5 Drawing Sheets

USING INERTIAL SENSORS TO PROVIDE SMOOTHED EXPOSURE AND WHITE BALANCE ADJUSTMENTS FOR VIDEO AND PHOTOGRAPHIC APPLICATIONS

TECHNICAL FIELD

The present invention relates generally to image capture and processing. More particularly, the invention relates to improved systems and techniques for providing smoothed exposure and white balance adjustments for video and photographic applications.

BACKGROUND

Still-image photography and full-motion video have been continually improved over the years. From Nièpce's photo etchings beginning in 1822, through the development by Nièpce and Daguerre of photography using silver compounds, through the development of inexpensive and widely available cameras, through instant photography continuing with modern digital photography, the ability to record still and moving images has become more and more widespread until it is now nearly universal. Many people document every aspect of their lives by gathering and distributing images of interesting or noteworthy events.

These days, photography is often casual, carried out under widely varying lighting conditions, by photographers who are not interested in making meticulous camera adjustments. Nonetheless, such photographers would like their photographs and videos to look attractive and to resemble the subject, particularly in terms of such properties as white balance. White balance is a camera setting that adjusts for lighting in order to make white objects appear white in a photo or video. This is more difficult than it might seem to be, due to the fact that the light cast from two different sources may differ substantially in terms of spectral content and color. Ambient light is very rarely truly white in nature. The spectral content of a light source may be referred to as color temperature. The light from an incandescent or halogen bulb, for example, may emphasize the orange and yellow regions of the spectrum, while a fluorescent light may emphasize the blue region of the spectrum.

A proper white balance setting in a camera will prevent a white bed sheet in a photo from appearing to be orange, for example, while the sheet is being illuminated by candlelight. Because it is particularly important that neutral colors (such as white or gray) appear correctly, white balance may also be referred to as color balance or gray balance. White balance is a measure of the relative intensities of each color component of an image (such as the red, green, and blue additive primary colors of light). Color constancy is a characteristic of the human visual system—the human brain provides a relatively constant color perception over a significant range of wavelength variation of light illuminating the subject. Artificial mechanisms for capturing images, on the other hand, need to incorporate mechanisms for adjustment and correction in order to achieve such constancy.

Automatic white balance (AWB) and auto exposure (AE) algorithms employed in the camera imaging pipeline are critical to the color appearance of digital pictures and videos. The goal of AWB algorithms is to provide the color constancy feature of the human visual system, wherein the perceived color of an object remains substantially constant under different conditions of illumination. Thus, AWB algorithms have to determine, from the image content itself, the necessary color correction to perform in response to the current illumination. For video, the AWB algorithm is usually employed on a per-frame basis to account for scene changes. Auto exposure algorithms aim to adjust the camera's exposure time to minimize overexposed and underexposed areas. This functionality is needed since cameras are only capable of measuring a limited range of the total illumination in the scene (i.e., cameras have limited dynamic range). To capture bright areas, a shorter exposure time is needed; otherwise, the image will be overexposed or saturated (white). On the other hand, in dark areas a longer exposure time is needed; otherwise, the image will be underexposed or black. The goal of AE algorithms is to find the optimal exposure for the scene being captured. When capturing video, this is typically done using a control loop that analyzes incoming video frames and provides estimates of the best exposure time to capture subsequent frames.

AWB algorithms attempt to estimate the illumination in an image by making some assumptions regarding the distribution of colors in the image. Then, these AWB algorithms correct the image as if it was taken under standard illumination. Some of the most well known and widely used AWB algorithms are the white patch algorithm, which assumes that the brightest point in the image is white (maximum reflectance); and the gray world algorithm which assumes that the average reflectance of a scene is achromatic. Other AWB algorithms are based upon certain assumptions regarding the content of an image.

AE algorithms typically analyze exposure statistics of an image (e.g., an intensity histogram) to determine how much the exposure time should be changed in order to obtain "optimal" statistics for the next captured image. Different criteria for defining the "optimal" exposure may be used, and those typically follow a heuristic approach. Illustrative heuristic approaches include having the mean intensity value close to a neutral gray, prioritizing shadow areas, constraining the optimization to a region pre-set by the user, or prioritizing skin tones.

Conventional AWB and AE algorithms do not provide optimal performance in many real-world scenarios. These AWB and AE algorithms are executed on a per-frame basis while capturing video sequences. This often leads to undesirable tonal fluctuations and exposure variations in video frames, as is commonly observed in the context of mobile cameras.

SUMMARY OF SOME EMBODIMENTS

According to one embodiment, a method comprises gathering a first image frame; storing in a memory buffer the first image frame, a first white balance value for the first image frame, and a first exposure value for the first image frame; sensing information from one or more inertial sensors in a camera; gathering a second image frame and gathering one or more intermediate image frames after the gathering of the first image frame and prior to the gathering of the second image frame; using the sensed information to determine a distance traversed by the camera from the gathering of the first image frame to the gathering of the second image frame and, in response to the distance exceeding a predetermined threshold, determining a second white balance value and a second exposure value for the second image frame; and determining, estimating, or calculating a smoothed white balance value and a smoothed exposure value for the one or more intermediate image frames.

According to another embodiment, a method comprises gathering a first image frame; storing in a memory buffer the first image frame, a first white balance value for the first image frame, and a first exposure value for the first image frame; gathering a second image frame and gathering one or more intermediate image frames after the gathering of the first image frame and prior to the gathering of the second image frame; storing in a memory buffer the second image frame, a second white balance value for the second image frame, and a second exposure value for the second image frame; determining whether or not the first white balance value is within a first specified threshold of the second white balance value; and determining whether or not the first exposure value is within a second specified threshold of the second exposure value; and in response to the first white balance value not being within the first specified threshold of the second white balance value, or in response to the first exposure value not being within the second specified threshold of the second exposure value, then determining, estimating, or calculating a smoothed white balance value and a smoothed exposure value for the one or more intermediate image frames.

According to another embodiment, an apparatus comprises at least one processor, and at least one memory including computer program code, the at least one memory and the computer program code being configured, with the at least one processor, to cause, at least in part, the apparatus to perform gathering a first image frame; storing in a memory buffer the first image frame, a first white balance value for the first image frame, and a first exposure value for the first image frame; sensing information from one or more inertial sensors in a camera; gathering a second image frame and gathering one or more intermediate image frames after the gathering of the first image frame and prior to the gathering of the second image frame; using the sensed information to determine a distance traversed by the camera from the gathering of the first image frame to the gathering of the second image frame and, in response to the distance exceeding a predetermined threshold, determining a second white balance value and a second exposure value for the second image frame; and determining, estimating, or calculating a smoothed white balance value and a smoothed exposure value for the one or more intermediate image frames.

According to another embodiment, an apparatus comprises at least one processor, and at least one memory including computer program code, the at least one memory and the computer program code being configured, with the at least one processor, to cause, at least in part, the apparatus to perform gathering a first image frame; storing in a memory buffer a the first image frame, a first white balance value for the first image frame, and a first exposure value for the first image frame; gathering a second image frame and gathering one or more intermediate image frames after the gathering of the first image frame and prior to the gathering of the second image frame; storing in a memory buffer the second image frame, a second white balance value for the second image frame, and a second exposure value for the second image frame; determining whether or not the first white balance value is within a first specified threshold of the second white balance value; and determining whether or not the first exposure value is within a second specified threshold of the second exposure value; and in response to the first white balance value not being within the first specified threshold of the second white balance value, or in response to the first exposure value not being within the second specified threshold of the second exposure value, then determining, estimating, or calculating a smoothed white balance value and a smoothed exposure value for the one or more intermediate image frames.

According to another embodiment, a computer program product comprises code stored in a non-transitory computer readable memory for performing at least the following when executed on a computer device: gathering a first image frame; storing in a memory buffer the first image frame, a first white balance value for the first image frame, and a first exposure value for the first image frame; sensing information from one or more inertial sensors in a camera; gathering a second image frame and gathering one or more intermediate image frames after the gathering of the first image frame and prior to the gathering of the second image frame; using the sensed information to determine a distance traversed by the camera from the gathering of the first image frame to the gathering of the second image frame and, in response to the distance exceeding a predetermined threshold, determining a second white balance value and a second exposure value for the second image frame; and determining, estimating, or calculating a smoothed white balance value and a smoothed exposure value for the one or more intermediate image frames.

According to another embodiment, a computer program product comprises code stored in a non-transitory computer readable memory for performing at least the following when executed on a computer device: gathering a first image frame; storing in a memory buffer the first image frame, a first white balance value for the first image frame, and a first exposure value for the first image frame; gathering a second image frame and gathering one or more intermediate image frames after the gathering of the first image frame and prior to the gathering of the second image frame; storing in a memory buffer the second image frame, a second white balance value for the second image frame, and a second exposure value for the second image frame; determining whether or not the first white balance value is within a first specified threshold of the second white balance value; and determining whether or not the first exposure value is within a second specified threshold of the second exposure value; and in response to the first white balance value not being within the first specified threshold of the second white balance value, or in response to the first exposure value not being within the second specified threshold of the second exposure value, then determining, estimating, or calculating a smoothed white balance value and a smoothed exposure value for the one or more intermediate image frames.

According to another embodiment, an apparatus comprises means for performing the steps of one of the above methods.

According to another embodiment, a computer program product includes one or more sequences of one or more instructions which, when executed by one or more processors, cause an apparatus to at least perform the steps of one of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE FIGURES

Various embodiments are illustrated by way of example, and not by way of limitation, in the figures of the accompanying drawings in which.

DESCRIPTION OF SOME EMBODIMENTS

Examples of methods, apparatuses, and computer program products are disclosed for providing smoothed exposure and white balance adjustments for video and photographic applications. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

According to a set of illustrative embodiments disclosed herein, an adaptation or calculation rate of auto white balance and auto exposure algorithms are changed or adjusted, based on inertial sensors (such as accelerometers and gyroscopes) in the camera to reduce undesirable tonal fluctuation. The inertial sensor values are used to calculate an accumulative distance the camera has traveled, and only when this distance reaches a certain threshold new values of white balance and exposure are adopted or recalculated for the incoming frame. This can create a jump in the exposure and white balance settings at this frame. To smooth it out, the most recent captured frame or frames are stored in a memory buffer and the white balance and exposure settings are interpolated for the frame or frames between the frame when the exposure and white balance were last changed and the current frame. In contrast with the prior art, which changes exposure and white balance parameters on a per-frame basis, our invention produces more stable videos regarding tonal settings.

Figure 1:
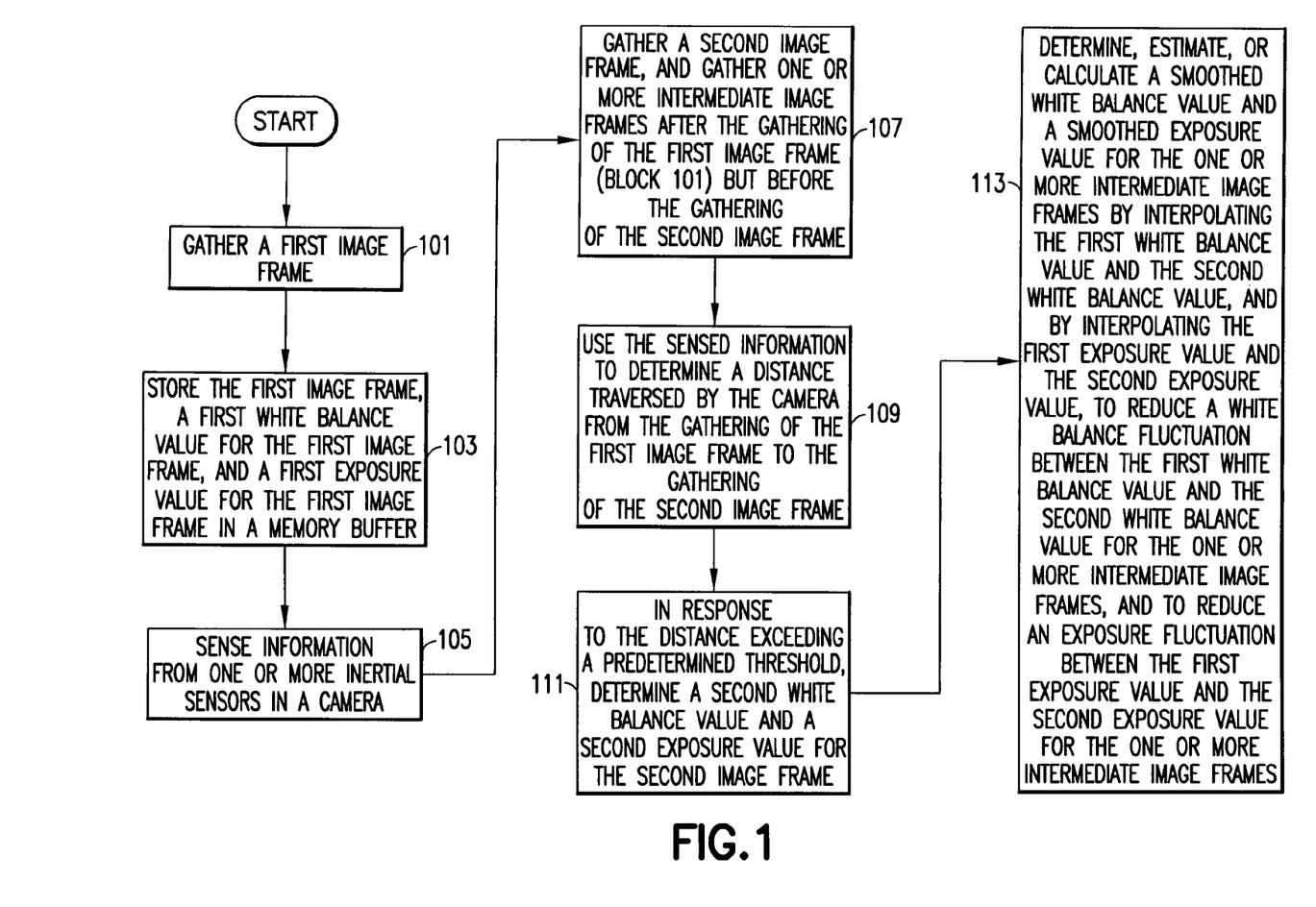
FIG. 1 is a flowchart of a first exemplary set of processes for providing smoothed exposure and white balance adjustments for video and photographic applications according to one set of embodiments.

FIG. 1 is a flowchart of a first exemplary set of processes for providing smoothed exposure and white balance adjustments for video and photographic applications according to one set of embodiments. The operational sequence commences at block 101 where a first image frame is gathered. Next, at block 103, the first image frame, a first white balance value for the first image frame, and a first exposure value for the first image frame, are all stored in a memory buffer. Information is sensed from one or more inertial sensors in a camera (block 105). A second image frame is gathered, and one or more intermediate image frames are gathered after the gathering of the first image frame but prior to the gathering of the second image frame (block 107). Illustratively, the first image frame, the second image frame, and the one or more intermediate image frames are stored in the buffer. In some cases, it is not necessary to store exposure and white balance values for every frame of the one or more intermediate frames, as these values may be interpolated based upon the first image frame and the second image frame, or based upon a previous image frame and a successive image frame of the one or more intermediate frames. The sensed information is used to determine a distance traversed by the camera from the gathering of the first image frame to the gathering of the second image frame (block 109).

In response to the distance exceeding a predetermined threshold, a second white balance value for the second image frame and a second exposure value for the second image frame are determined (block 111). A smoothed white balance value for the one or more intermediate image frames and a smoothed exposure value for the one or more intermediate image frames are determined, estimated, or calculated by interpolating the first white balance value and the second white balance value, and by interpolating the first exposure value and the second exposure value, to reduce a white balance fluctuation between the first white balance value and the second white balance value for the one or more intermediate image frames, and to reduce an exposure fluctuation between the first exposure value and the second exposure value for the one or more intermediate image frames (block 113).

Conventional auto-exposure and auto white balance algorithms are executed on a per-frame basis while capturing video sequences. This often leads to undesirable fluctuations in color tone and exposure in video frames, as is commonly observed with still images and videos that are gathered using mobile cameras. The procedures of FIGS. 1-3 changes the frequency for computing values for automatic exposure and automatic white balance during video capture to adapt to camera movement. Instead of computing values for automatic exposure and automatic white balance for every captured frame, one or more inertial sensors are provided (such as gyroscopes or accelerometers) to measure an approximate movement or motion of the camera, and set the frequency of evaluation of automatic exposure and automatic white balance according to an amount of measured movement or motion. If it is detected that the camera is still, the frequency is lowered so that the automatic white balance and automatic exposure values remain fixed for a short time interval. This scenario assumes that illumination and scene changes are unlikely during a short time interval. If motion is detected, the frequency is increased so that exposure and white balance are computed more often to deal with potential scene changes due to the camera movement. Since automatic white balance and automatic exposure will be calculated and changed less often, more sophisticated algorithms for computing white balance and automatic exposure may, but need not, be employed to reduce color tonal fluctuations and exposure variations.

Figure 2:
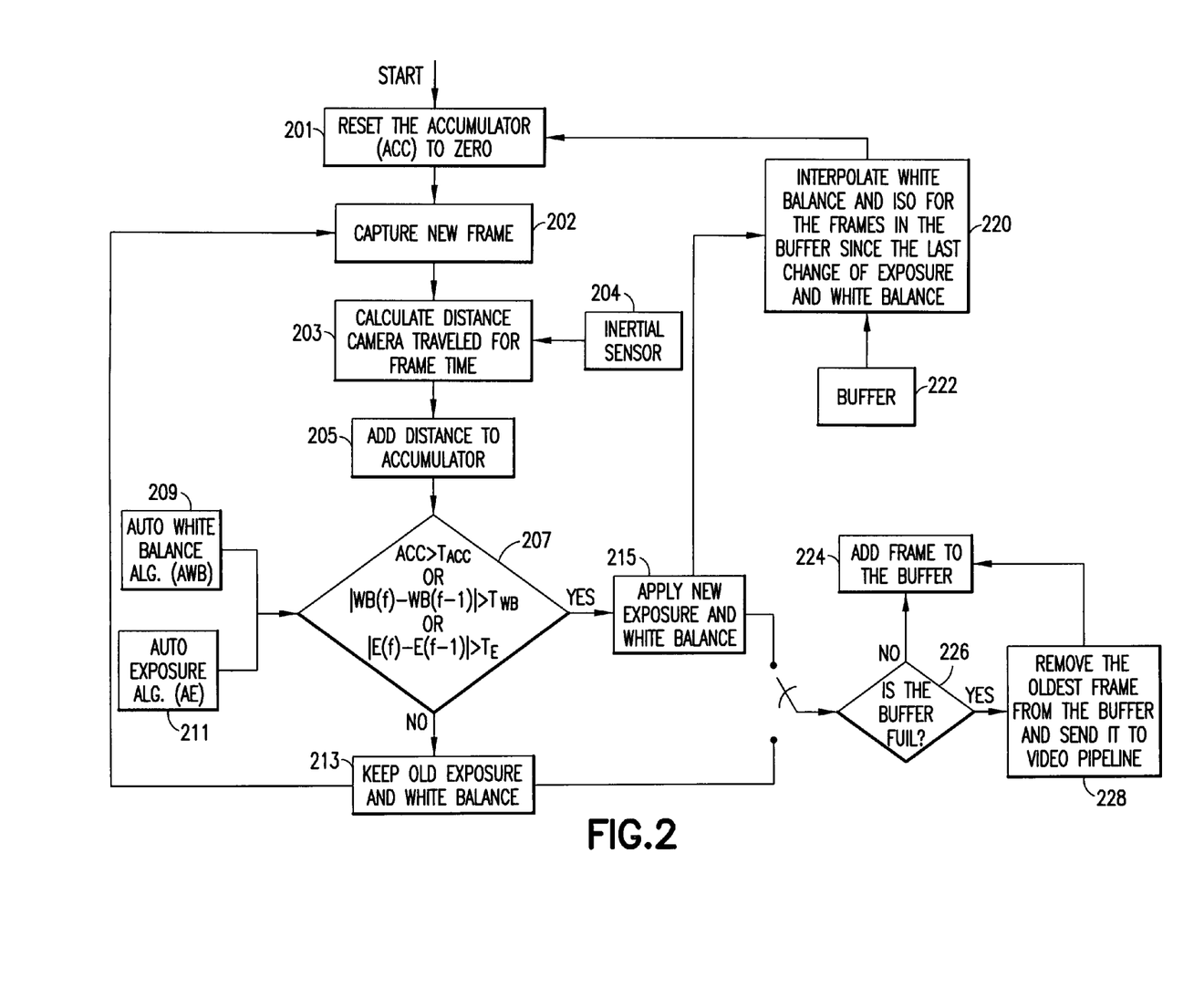
FIG. 2 is a flowchart of a second exemplary set of processes for providing smoothed exposure and white balance adjustments for video and photographic applications according to one set of embodiments.

FIG. 2 is a flowchart of a second exemplary set of processes for providing smoothed exposure and white balance adjustments for video and photographic applications according to one set of embodiments. First, initialize a motion accumulator to zero (block 201). Then, capture a first video frame at block 202. At block 203, calculate a camera movement (amount and direction of movement) during the frame time (1/frame rate) based on an inertial sensor 204. Also at block 203, use an auto white balance (AWB) algorithm 209 to calculate a new white balance setting using the first video frame as input, and use an auto exposure (AE) algorithm 211 to calculate a new exposure setting using the first video frame as input.

At block 205, the camera movement that was calculated at block 203 is added to the motion accumulator to calculate the total distance the camera has traveled. At block 207, if the distance traveled reaches a predetermined threshold, then the new values of white balance and exposure computed at block 203 are applied at block 215, i.e., they replace a formerly existing value of white balance and a formerly existing value of exposure, so that the capture of new (subsequent) frames (block 202) from now on uses these new values. If the buffer 222 is full (block 226), then remove the oldest frame from the buffer 222 and send the oldest frame to a video storage pipeline (block 228). The current frame is then added to the buffer (block 224). After this frame is added to the buffer 222, a smoothing algorithm (block 220), to be described in greater detail hereinafter, is executed. The operational sequence then loops back to block 201 where the motion accumulator is reset to zero.

Also at block 207, a test is performed to ascertain whether or not the value of white balance calculated at block 209, or the value of exposure calculated at block 211, or both the value of white balance calculated at block 209 and the value of exposure calculated at block 211, are outside of a specified threshold with reference to corresponding values of white balance or exposure from one or more previous frames (i.e., did a significant change in white balance or exposure occur?). If one or both of the value of white balance and the value of exposure are outside of the specified threshold, then this change is most likely due to illumination changes, and the new computed white balance and exposure values are applied as was described previously in connection with block 215. If the buffer 222 is full, the oldest frame in the buffer is pushed out and sent to the video processing pipeline for proper storage (block 228). The current frame is added to the buffer 222 (block 224), and the smoothing algorithm is executed (block 220). The motion accumulator is then reset to zero (block 201). Otherwise (if both the value of white balance and the value of exposure fall within the specified threshold and the distance traveled by the camera is below a predetermined value), the white balance and exposure settings are kept unchanged (block 213); if the buffer 222 is full, the oldest frame is pushed out and sent to the video processing pipeline for proper storage (block 228). The current frame is added to the buffer (block 224), and the procedure continues by capturing a new frame (block 202).

Pursuant to the operational sequence of FIG. 2, the new computed exposure and white balance values are only applied once the camera is moved by a certain amount or the estimated white balance or exposure settings significantly differ from their previous estimates. When those conditions do not hold, the white balance and exposure settings are kept unchanged. Therefore, the procedure of FIG. 2 reduces small undesirable fluctuations, but still allows the exposure and white balance to adapt when there are significant changes in illumination. The jumps in white balance and exposure settings between subsequent groups of frames taken with different settings are smoothed out by keeping a buffer with the most recent captured frames and applying a smoothing algorithm.

Figure 3:
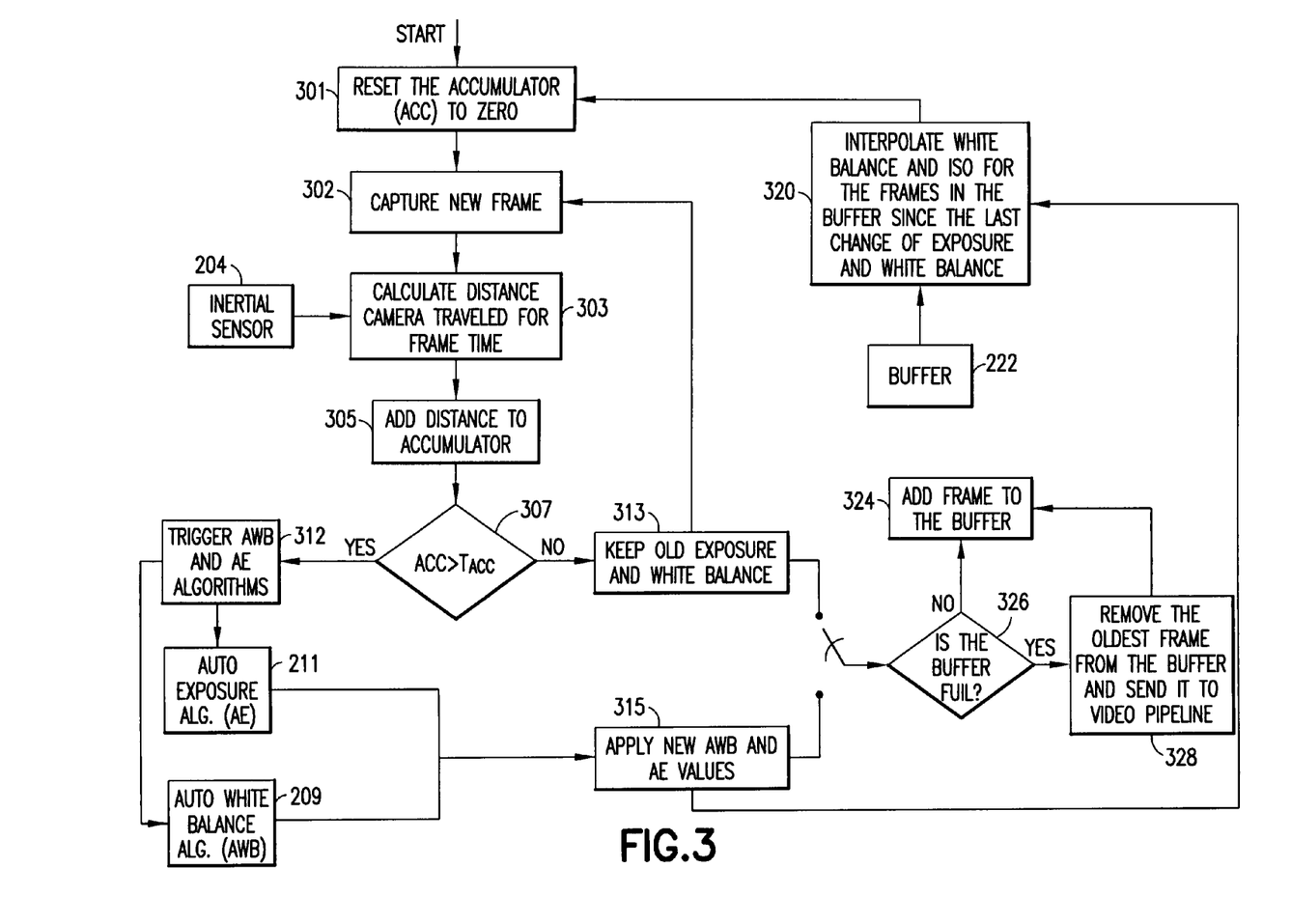
FIG. 3 is a flowchart of a third exemplary set of processes for providing smoothed exposure and white balance adjustments for video and photographic applications according to one set of embodiments.

FIG. 3 is a flowchart of a third exemplary set of processes for providing smoothed exposure and white balance adjustments for video and photographic applications according to one set of embodiments. The alternative implementation of FIG. 3 reduces the computational complexity of a video pipeline by only recalculating the white balance and exposure when the camera has moved a certain distance. This implementation has the characteristic that it cannot detect significant illumination changes. However, it may be used in conjunction with an illumination sensor, or it may be used for short video clips where significant illumination changes, such as turning a light switch, are unlikely.

The operational sequence of FIG. 3 commences at block 301 where a motion accumulator is initialized to zero. At block 302, a new video frame is captured. Then, at block 303, a camera movement (amount and direction of movement) is calculated during the frame time (1/frame rate) based on the inertial sensor 204. The camera movement computed at block 303 is added to the accumulator at block 305 to calculate the total distance the camera has traveled. If the distance traveled reaches or exceeds a certain threshold (block 307), then the automatic white balance (AWB) algorithm 209 and the auto exposure (AE) algorithm 211 are triggered (block 312) to calculate new values for white balance and exposure settings. The new values for white balance and exposure settings are applied (block 315) from that frame forward. Otherwise, the negative branch from block 307 leads to block 313 where the old (existing) values of the white balance and exposure are kept. In either case, if the buffer 222 is full (block 326), the oldest frame in the buffer is pushed out and sent to the video processing pipeline for proper storage (block 328). The current frame is then added to the buffer 222 (block 324).

If the operational sequence of FIG. 3 progressed through block 313, then processing continues by capturing a new frame (block 302) with old (existing) settings. If the operational sequence of FIG. 3 progressed through block 315, capturing is done with the new settings, the smoothing algorithm is executed (block 320), and the program loops back to block 301 where the accumulator is reset to zero.

For the smoothing algorithm (block 320, FIG. 3 and block 220, FIG. 2), one approach is to obtain the white balance and exposure values for the frame when the exposure and white balance were last changed and the first frame taken with the new settings, and interpolate the white balance and ISO settings for the intermediate frames in between (as the frames in the buffer have already been captured, their exposure times cannot be changed any more, but their ISO settings can be modified in order to compensate for it). This makes the assumption that those values are global settings in the frame, which is not always true. Another approach is to use the algorithm proposed in the paper "Tonal Stabilization of Video" by Farbman et al., SIGGRAPH 2011, by considering the frame when the exposure and white balance were last changed, and the first frame taken with the new settings, as anchor frames. Alternatively, other similar approaches could be used to smooth out the transition. Using this type of buffer is in sync with next-generation camera architectures, where a circular buffer is planned for applications such as Zero Shutter Lag.

Figure 4:
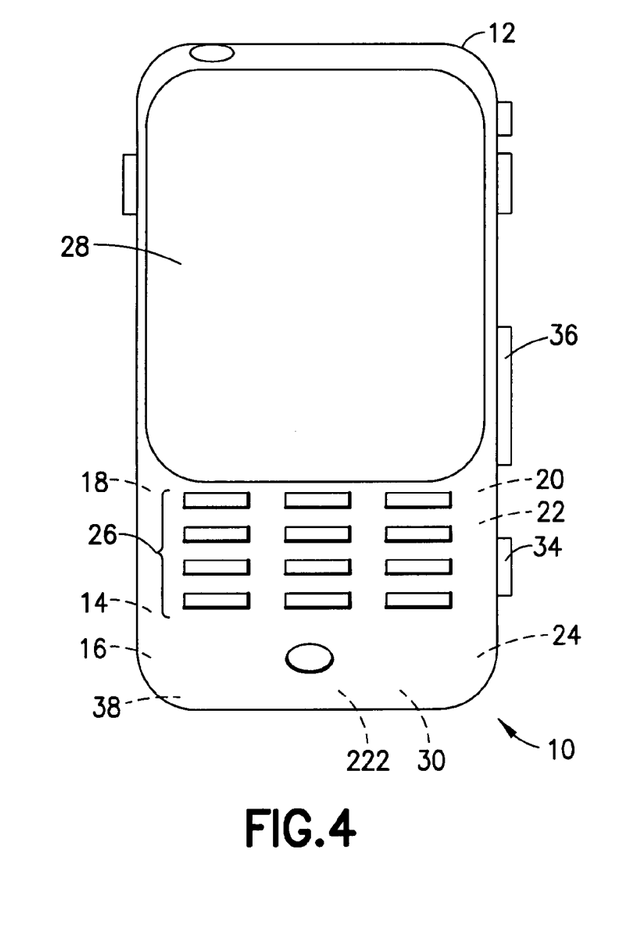
FIG. 4 is a diagram of a first device that can be used to implement an embodiment of the invention.

Referring to FIG. 4, there is shown a front view of an illustrative electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device 10 is a multi-function portable electronic device. However, in alternate embodiments, features of the various embodiments of the invention could be used in any suitable type of portable electronic device such as a mobile phone, a gaming device, a music player, a notebook computer, a camera device, or a personal digital assistant, for example. In addition, as is known in the art, the device 10 can include multiple features or applications such as a camera, a music player, a game player, or an Internet browser, for example. The device 10 generally comprises a housing 12, a transmitter 14, a receiver 16, an antenna 18 (connected to the transmitter 14 and the receiver 16), electronic circuitry 20, such as a controller (which could include a processor [or central processing unit (CPU)], for example) 22 and a memory 24 for example, within the housing 12, a user input region 26, a display 28, an inertial sensor 204 such as an accelerometer or gyroscope, and a memory buffer 222. It should be understood that although the user input region 26 is illustrated as a keypad, various exemplary embodiments of the invention may include touch-screen technology at the user input region 26. The display 28 could also form a user input section, such as a touch screen. It should be noted that in alternate embodiments, the device 10 may have any suitable type of features as known in the art. Additionally, all of these components within the device 10 are normally powered by a portable power supply such as a battery 30.

Figure 5:
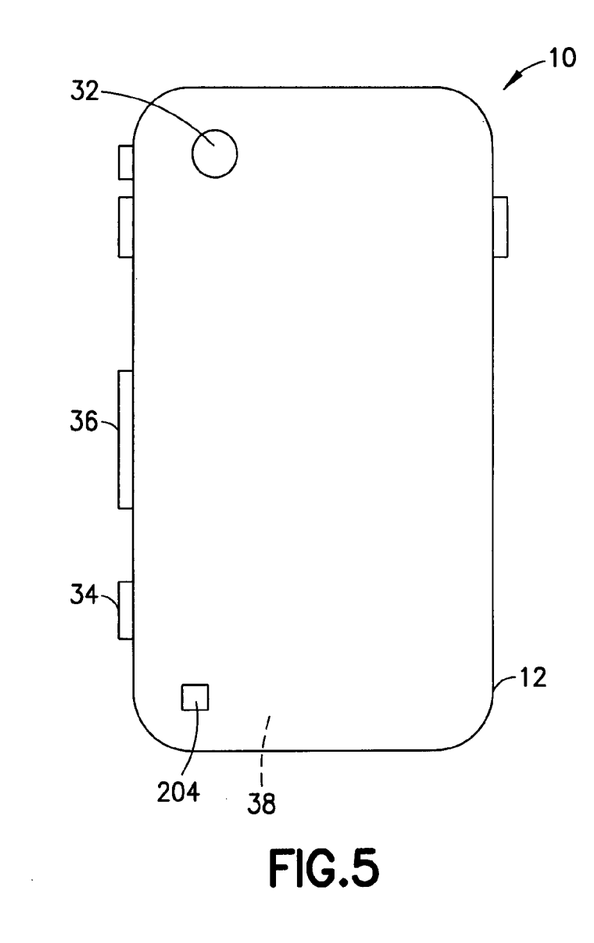
FIG. 5 is an alternate view of the device shown in FIG. 4.

Referring now also to FIG. 5, the electronic device 10 further comprises a camera 32 which is shown as being rearward facing (for example for capturing images and/or video for local storage) but may alternatively or additionally be forward facing (for example for video calls). The camera 32 may be controlled by a shutter actuator 34 and optionally by a zoom actuator 36. However, any suitable camera control functions and/or camera user inputs may be provided.

The electronic device 10 further comprises a camera exposure system 38. According to some embodiments of the invention, the camera exposure system 38 is configured to perform the AE algorithm 211 (FIGS. 2 and 3) and the AWB algorithm 209. For example, the choice of exposure time directly affects the appearance of the photograph taken. The exposure time (or shutter speed) determines the amount of time during which the sensor collects light while capturing a picture. This makes the image brighter or darker. Also, in photography for scenes with motion, a short exposure time "freezes" objects in motion; on the other hand, longer exposure times in images provides a 'blur' due to the moving objects in the scene (also known as "motion blur", which can be used to depict motion, for example).

Figure 6:
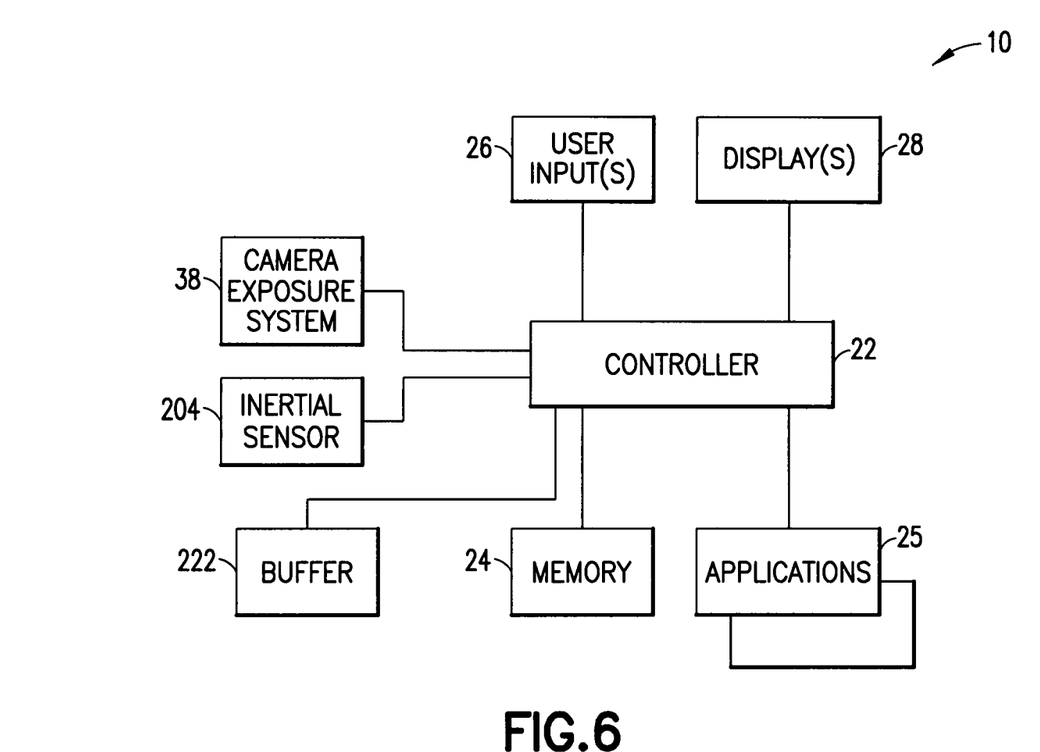
FIG. 6 is a diagram of a second device that can be used to implement an embodiment of the invention.

Referring now also to FIG. 6, the device 10 generally comprises a controller 22 such as a microprocessor for example. The electronic circuitry includes a memory 24 coupled to the controller 22, such as on a printed circuit board for example. The memory 24 could include multiple memories including removable memory modules and one or more buffers, for example. Alternatively or additionally, a separate buffer 222 may be provided. An inertial sensor 204 may comprise one or more accelerometers or gyroscopes. The device has applications 25, such as software, which the user can use. The applications can include, for example, a telephone application, an Internet browsing application, a game playing application, a digital camera application, a map/gps application, and so forth. These are only some examples and should not be considered as limiting. One or more user inputs 26 are coupled to the controller 22 and one or more displays 28 are coupled to the controller 22. The camera exposure system 38 is also coupled to the controller 22.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

Operations of the flowcharts of FIGS. 1-3 and combinations of operations in the flowcharts may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowcharts. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture, the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods of FIGS. 1-3 are described with help of apparatus 10 (FIGS. 4-6). However, the operations of the methods can be described and/or practiced by using any other apparatus.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 4-6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

As will be appreciated by one skilled in the art, aspects of the present invention may be embodied as an apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, and so forth, or any suitable combination of the foregoing.

Computer program code for carrying out operations for aspects of the present invention may be written in any combination of one or more programming languages, including an object-oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable-medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any and all means or step plus function elements in the claims below are intended to include any structure, material, or act for performing the function in combination with other claimed elements as specifically claimed. The description of various embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

We claim:

1. A method comprising:
   gathering a first image frame;
   storing in a memory buffer the first image frame, a first white balance value for the first image frame, and a first exposure value for the first image frame;
   sensing information from one or more inertial sensors in a camera;
   gathering a second image frame and gathering one or more intermediate image frames after the gathering of the first image frame and prior to the gathering of the second image frame;
   using the sensed information from the one or more inertial sensors to determine a distance traversed by the camera from the gathering of the first image frame to the gathering of the second image frame and,
   in response to the distance exceeding a predetermined threshold,
   determining a second white balance value and a second exposure value for the second image frame; and
   determining, estimating, or calculating a smoothed white balance value and a smoothed exposure value for the one or more intermediate image frames;
   else in response to the distance not exceeding the predetermined threshold, utilizing the first white balance value and the first exposure value for the one or more intermediate image frames.

2. The method of claim 1 wherein the determining, estimating, or calculating is performed by interpolating the first white balance value and the second white balance value, and by interpolating the first exposure value and the second exposure value.

3. The method of claim 2 wherein the interpolating of the first white balance value and the second white balance value is performed so as to reduce a white balance fluctuation between the first white balance value and the second white balance value for the one or more intermediate image frames.

4. The method of claim 2 wherein the interpolating of the first exposure value and the second interpolation value is performed so as to reduce an exposure fluctuation between the first exposure value and the second exposure value for the one or more intermediate image frames.

5. The method of claim 1 further comprising determining whether or not the first white balance value is within a specified threshold of the second white balance value and, in response to the first white balance value not being within the specified threshold of the second white balance value, determining the second white balance value and the second exposure value for the second image frame.

6. The method of claim 1 further comprising determining whether or not the first exposure value is within a specified threshold of the second exposure value and, in response to the first exposure value not being within the specified threshold of the second exposure value, determining the second white balance value and the second exposure value for the second image frame.

7. The method of claim 1 further comprising using the sensed information to update a motion accumulator specifying a total distance traversed by the camera from the gathering of the first image frame.

8. A method comprising:
   gathering a first image frame;
   storing in a memory buffer the first image frame, a first white balance value for the first image frame, and a first exposure value for the first image frame;
   gathering a second image frame and gathering one or more intermediate image frames after the gathering of the first image frame and prior to the gathering of the second image frame;
   storing in a memory buffer the second image frame, a second white balance value for the second image frame, and a second exposure value for the second image frame;
   determining whether or not the first white balance value is within a first specified threshold of the second white balance value; and determining whether or not the first exposure value is within a second specified threshold of the second exposure value; and
   in response to the first white balance value not being within the first specified threshold of the second white balance value, or in response to the first exposure value not being within the second specified threshold of the second exposure value, then determining, estimating, or calculating a smoothed white balance value and a smoothed exposure value for the one or more intermediate image frames;
   else in response to the first white balance value being within the first specified threshold of the second white balance value and the first exposure value being within the second specified threshold of the second exposure value, then utilizing the first white balance value and the first exposure value for the one or more intermediate image frames.

9. The method of claim 8 wherein the determining, estimating, or calculating is performed by interpolating the first white balance value and the second white balance value, and by interpolating the first exposure value and the second exposure value.

10. The method of claim 9 wherein the interpolating of the first white balance value and the second white balance value is performed so as to reduce a white balance fluctuation between the first white balance value and the second white balance value for the one or more intermediate image frames.

11. The method of claim 9 wherein the interpolating of the first exposure value and the second interpolation value is performed so as to reduce an exposure fluctuation between the first exposure value and the second exposure value for the one or more intermediate image frames.

12. An apparatus comprising at least one processor, and at least one memory including computer program code, the at least one memory and the computer program code configured, with the at least one processor, to cause, at least in part, the apparatus to perform:
    gathering a first image frame;
    storing in a memory buffer the first image frame, a first white balance value for the first image frame, and a first exposure value for the first image frame;
    sensing information from one or more inertial sensors in a camera;
    gathering a second image frame and gathering one or more intermediate image frames after the gathering of the first image frame and prior to the gathering of the second image frame;
    using the sensed information from the one or more inertial sensors to determine a distance traversed by the camera from the gathering of the first image frame to the gathering of the second image frame and,
    in response to the distance exceeding a predetermined threshold,
    determining a second white balance value and a second exposure value for the second image frame; and
    determining, estimating, or calculating a smoothed white balance value and a smoothed exposure value for the one or more intermediate image frames;

else in response to the distance not exceeding the predetermined threshold, utilizing the first white balance value and the first exposure value for the one or more intermediate image frames.

13. The apparatus of claim 12, wherein the apparatus performs the determining, estimating, or calculating by interpolating the first white balance value and the second white balance value, and by interpolating the first exposure value and the second exposure value.

14. The apparatus of claim 13, wherein the apparatus performs the interpolating of the first white balance value and the second white balance value so as to reduce a white balance fluctuation between the first white balance value and the second white balance value for the one or more intermediate image frames.

15. The apparatus of claim 13, wherein the apparatus performs the interpolating of the first exposure value and the second interpolation value so as to reduce an exposure fluctuation between the first exposure value and the second exposure value for the one or more intermediate image frames.

16. The apparatus of claim 12, wherein the apparatus determines whether or not the first white balance value is within a specified threshold of the second white balance value and, in response to the first white balance value not being within the specified threshold of the second white balance value, the apparatus determines the second white balance value and the second exposure value for the second image frame.

17. The apparatus of claim 12, wherein the apparatus determines whether or not the first exposure value is within a specified threshold of the second exposure value and, in response to the first exposure value not being within the specified threshold of the second exposure value, the apparatus determines the second white balance value and the second exposure value for the second image frame.

18. The apparatus of claim 12, wherein the apparatus uses the sensed information to update a motion accumulator specifying a total distance traversed by the camera from the gathering of the first image frame.

19. An apparatus comprising at least one processor, and at least one memory including computer program code, the at least one memory and the computer program code configured, with the at least one processor, to cause, at least in part, the apparatus to perform:
gathering a first image frame;
storing in a memory buffer a the first image frame, a first white balance value for the first image frame, and a first exposure value for the first image frame;
gathering a second image frame and gathering one or more intermediate image frames after the gathering of the first image frame and prior to the gathering of the second image frame;
storing in a memory buffer the second image frame, a second white balance value for the second image frame, and a second exposure value for the second image frame;
determining whether or not the first white balance value is within a first specified threshold of the second white balance value; and determining whether or not the first exposure value is within a second specified threshold of the second exposure value;
in response to the first white balance value not being within the first specified threshold of the second white balance value, or in response to the first exposure value not being within the second specified threshold of the second exposure value, then determining, estimating, or calculating a smoothed white balance value and a smoothed exposure value for the one or more intermediate image frames;

else in response to the first white balance value being within the first specified threshold of the second white balance value and the first exposure value being within the second specified threshold of the second exposure value, then utilizing the first white balance value and the first exposure value for the one or more intermediate image frames.

20. The apparatus of claim 19, wherein the apparatus performs the determining, estimating, or calculating by interpolating the first white balance value and the second white balance value, and by interpolating the first exposure value and the second exposure value.

21. The apparatus of claim 20, wherein the apparatus performs the interpolating of the first white balance value and the second white balance value so as to reduce a white balance fluctuation between the first white balance value and the second white balance value for the one or more intermediate image frames.

22. The apparatus of claim 20, wherein the interpolating of the first exposure value and the second interpolation value is performed so as to reduce an exposure fluctuation between the first exposure value and the second exposure value for the one or more intermediate image frames.

23. A computer program product comprising code stored in a non-transitory computer readable memory for performing at least the following when executed on a computer device:
gathering a first image frame;
storing in a memory buffer the first image frame, a first white balance value for the first image frame, and a first exposure value for the first image frame;
sensing information from one or more inertial sensors in a camera;
gathering a second image frame and gathering one or more intermediate image frames after the gathering of the first image frame and prior to the gathering of the second image frame;
using the sensed information from the one or more inertial sensors to determine a distance traversed by the camera from the gathering of the first image frame to the gathering of the second image frame and,
in response to the distance exceeding a predetermined threshold,
determining a second white balance value and a second exposure value for the second image frame; and
determining, estimating, or calculating a smoothed white balance value and a smoothed exposure value for the one or more intermediate image frames;
else in response to the distance not exceeding the predetermined threshold, utilizing the first white balance value and the first exposure value for the one or more intermediate image frames.

24. A computer program product comprising code stored in a non-transitory computer readable memory for performing at least the following when executed on a computer device:
gathering a first image frame;
storing in a memory buffer the first image frame, a first white balance value for the first image frame, and a first exposure value for the first image frame;
gathering a second image frame and gathering one or more intermediate image frames after the gathering of the first image frame and prior to the gathering of the second image frame;

storing in a memory buffer the second image frame, a second white balance value for the second image frame, and a second exposure value for the second image frame;

determining whether or not the first white balance value is within a first specified threshold of the second white balance value; and determining whether or not the first exposure value is within a second specified threshold of the second exposure value; and in response to the first white balance value not being within the first specified threshold of the second white balance value, or in response to the first exposure value not being within the second specified threshold of the second exposure value, then determining, estimating, or calculating a smoothed white balance value and a smoothed exposure value for the one or more intermediate image frames;

else in response to the first white balance value being within the first specified threshold of the second white balance value and the first exposure value being within the second specified threshold of the second exposure value, then utilizing the first white balance value and the first exposure value for the one or more intermediate image frames.

\* \* \* \* \*